United States Patent [19]

Gargollo

[11] Patent Number: 5,035,532
[45] Date of Patent: Jul. 30, 1991

[54] METHOD AND APPARATUS FOR CONSTRUCTING AN ARTICULATED PAVEMENT SYSTEM

[76] Inventor: Roberto L. Gargollo, Alpes 650, Lomas de Chapultepec 11000, Mexico

[21] Appl. No.: 366,764

[22] Filed: Jun. 15, 1989

Related U.S. Application Data

[63] Continuation-in-part of Ser. No. 148,714, Jan. 26, 1988, Pat. No. 4,850,739.

[30] Foreign Application Priority Data

Jan. 16, 1989 [MX] Mexico ................................. 14563

[51] Int. Cl.⁵ .................................................. E01C 5/00
[52] U.S. Cl. ........................................... 404/41; 404/31
[58] Field of Search ........................ 404/17, 18, 29, 31, 404/32, 33, 34, 35, 37, 40-42, 82, 45, 46, 73; 52/612; 156/71, 293, 303.1; 428/60, 137; 264/35, 261, 263, 333; 405/15, 16, 17

[56] References Cited

U.S. PATENT DOCUMENTS

| | | | |
|---|---|---|---|
| 708,471 | 9/1902 | Flood | 404/41 |
| 1,379,440 | 5/1921 | Brainerd | 404/34 |
| 1,912,429 | 6/1933 | Burgess | 404/73 |
| 2,569,065 | 9/1951 | Lavin | 264/263 |
| 2,780,150 | 2/1957 | Yeoman | 404/73 |
| 3,030,951 | 4/1962 | Mandanno | 264/263 |
| 3,522,618 | 8/1970 | Stranzinger | 404/41 |
| 3,678,815 | 7/1972 | Younker | 404/73 |
| 3,923,410 | 12/1975 | Jordan et al. | 404/41 |
| 4,018,025 | 4/1977 | Collette | 404/41 |
| 4,465,398 | 8/1984 | Knudsen | 404/41 |
| 4,850,739 | 7/1989 | Gargollo | 404/41 |

FOREIGN PATENT DOCUMENTS

| | | | |
|---|---|---|---|
| 541652 | 10/1955 | Belgium | 404/41 |
| 2048991 | 4/1972 | Fed. Rep. of Germany | 404/41 |
| 2634586 | 9/1977 | Fed. Rep. of Germany | 404/41 |
| 1004695 | 4/1952 | France | 404/41 |
| 2551783 | 3/1985 | France | 404/41 |
| 667986 | 9/1964 | Italy | 404/41 |
| 280762 | 2/1952 | Switzerland | 404/41 |
| 1130171 | 10/1968 | United Kingdom | 404/41 |

Primary Examiner—Ramon S. Britts
Assistant Examiner—Gay Ann Spahn
Attorney, Agent, or Firm—Thomas E. Sisson

[57] ABSTRACT

A modular construction system that provides structures utilizable in the manufacture of bases for pavements, pavements, slopes, canals, walls, arches, and bridges. A flexible structure is obtained formed by the articulated and indissoluble union of a multiplicity of identical modular units that have articulated, unbreakable joints, although there are free spaces between the units, in such a way that when a weight is placed in any area of the flexible structure, a part of the load is immediately distributed to the adjacent areas, the structure thus resulting in a stress distribution system, being flexible, articulated, and indissoluble. The distribution of stresses occurs both in the horizontal and the vertical direction. Two or more structures can even be placed one on top of the other, duly articulated between each other, with a separating layer between each one of them, by means of latch pins such as to allow the structure to be flexible, functioning in a manner similar to how a single structure functions.

8 Claims, 16 Drawing Sheets

METHOD AND APPARATUS FOR CONSTRUCTING AN ARTICULATED PAVEMENT SYSTEM

This application is a continuation-in-part application of my copending U.S. Pat. application Ser. No. 148,714, filed Jan. 26, 1988, entitled METHOD AND APPARATUS FOR CONSTRUCTING AN ARTICULATED PAVEMENT SYSTEM, now U.S. Pat. Ser. No. 4,850,739.

BACKGROUND OF THE INVENTION

This invention relates to a modular construction system that provides structures utilizable in the manufacture of bases for pavements, slopes, canals, walls, arches and bridges.

With the purpose of clearly explaining the characteristics of this invention, reference is specifically made to the area of pavements, even though, as will be seen further on, it can be used in many other construction areas. It is well known that separate pieces of material can be used to create pavements on irregular surfaces. They have been used since ancient times even though the pieces are independent and do no interlock.

Later, pavements and bases for them had been built on irregular surfaces by means of the following process: first, in general the area is leveled, afterwards placing on the area, which is usually already flat by then, a multiplicity of layers of compound materials. Then, it is customary to place first a layer of rock dust and over it a layer of rock. This is flattened and compacted over the rock dust layer, then placing on top a second layer of rock dust. The material is again flattened and compacted, with the intention of forming a base for pavement or a rigid, stable road.

One of the main disadvantages of the present technology for construction of pavement foundations, pavements and roads in general, is that the loads exercised on one or more specific areas are not shared by the rest of the supporting structure. Thus, when an especially large load is exercised on a specific piece or area of the whole, there is no functional interconnection between the different pieces or area that allows the load to be shared with the adjacent pieces or areas. Further, frequently erosion and temperature variations allow humidity to form between the different pieces or areas, loosening them. When this weakened whole experiences excessive loads on specific pieces or areas, they are eventually destroyed, and later the entire complex must generally be rebuilt. It is due to this disadvantage that in the majority of cases the construction of roads and pavements involves high initial and maintenance costs.

SUMMARY OF THE INVENTION

The present inventive construction system attempts to avoid the main disadvantage to present technologies, since it allows building an assembled, articulated, flexible structure composed by the systematic union of a multiplicity of identical modular units which are each sufficiently strong and at the same time have a sufficient movement margin. Since there is play between the units in order to achieve an articulated, flexible union with the adjacent units, it is possible to immediately transmit to them part of the loads to which each of said units is subjected. Due to the assembly method of the modular units, proper to this construction system, the units are always secured together in the horizontal direction. But they can also be secured in the vertical direction by means of latch pins so as to preserve the flexibility of the structure.

The transmission of loads across the articulated, flexible joint, with play, exclusive to this invention, occurs in both the vertical and the horizontal direction to said modular units. If desired, two or more of said flexible structures can be articulated with each other in the vertical direction, one on top of the other, united by latch pins such as permit at the same time the existence of flexibility between the structures, with placement of separator layers between each of them (e.g., for concrete units, spraying with clay, or an equivalent cement separator). The complex formed by such structures will also provide the mentioned transmission of loads in both the horizontal and the vertical direction.

Such structures, simple to compound, become flexible, articulated, indissoluble, stress distribution systems. They are indissoluble due to the exclusive union between the modular units which, although it leaves free spaces between them, at the same time, prevents their separation once they have been articulated together.

That which has been set forth concerning this invention having specific reference to pavements and related structures ca be extended as regards the basic aspects to the construction of floors, slopes, canals, walls, arches and bridges.

In pavements and related structures, this present inventive system has a very wide range of possible uses, including pedestrian ways and floors for very diverse uses, vehicular roads for different flows, loads and speeds, amphibious roads such as those used for the operation of ships, and pavement foundations such as those of urban rapid transit roads and freeways.

As can be inferred from the great variety of possible uses for this new construction system, there is also a wide range of methods and materials for producing the modular units, including cement, ceramic materials, wood, plastics, and metals. In specific cases, the use of additives and fibers can also be convenient. For example, on pavements, use determines the characteristics required by both the materials for the fabrication of the modular units and the process itself. Furthermore, the modular units can be of a single material or assembled with two or more different ones.

Based on all that is set forth until here, the present application attempts to include all the uses that depend on the set of exclusive characteristics of this new construction system, which are articulated, flexible union, and distribution of loads both in the horizontal and the vertical direction, the resulting structure functioning as an indissoluble system of stress distribution, the foregoing being possible due to the exclusive articulated joint that, with play between the sufficiently strong modular units, allows them to slightly move and transmit part of the stresses to which the adjacent units ar subjected. However, such small movement is not sufficient as to affect the proper horizontal interlock between adjacent units.

Furthermore, the structures can be simple, with a single layer, or multiple, with two or more layers, and in both cases they can be fastened in the vertical direction by means of latch pins with separators between them and the units they join, and separators between layers for the case of two or more layers. The latch pins are such that they make it possible to preserve the flexibility of the structures they unite. Within a single layer the modular units are always identical. The units used to form the simplest structures of single layer have their perimetral sides and their upper and lower surfaces smooth. In order to form structures of a single layer that, as well as being secured horizontally (as always occurs in this new system due to the assembly of the modular units that constitute the structures) are also secured vertically, the untis are manufactured with notches and recessed surfaces on the perimetral sides which when said units are united, form together a filling hole and a cavity or mold for obtaining the latch pin. In order to obtain said latch pins in structures of two layers, the required units present the above-mentioned notches, but in this case the recessed surfaces are on the upper face, which form common cavities shared between adjacent units in the same and in both layers.

In order to form structures of three or more layers, the end layers (the initial or base layer and the final or upper layer of the multi-layered structure) are assembled with units of those required for structures of two layers, and for the intermediate layers a modular unit is used that also has recessed surfaces on its lower face, similar to those of the upper face, which makes possible the formation of cavities shared with adjacent units both of the same layer and of the contiguous layers.

In order to facilitate the description of the assembly of structures, it will be supposed by way of example that the modular units used are of concrete.

Each modular unit of the present invention has two end lobes and a pair of lobes on each side forming two space receiving end lobes. The two end lobes are exactly the same as each other. The same occurs with the lateral lobes, as well as with the end lobe receiving spaces. The play or free space between the modular units is due to the different relationship of magnitude between the parts of the modular units with which the interlocking is directly effected, which are end lobes and lobe receiving spaces. That is, the end lobes are sufficiently smaller than the spaces where they are received, in such a way that although the units can be displaced and transmit stresses to adjacent units, they remain interlocked in the horizontal direction.

In order to form a simple structure of a single layer, each modular unit is placed horizontally and interlocked with adjacent units by means of the entrance of the lobe of one unit into the receiving space of the other, both units being locked in the horizontal direction. There is, however, a free space between units in the articulated joint that is formed, and therefore the union is flexible. The placement of units is continued, each of them remaining locked with those already in place, thus obtaining a flexible, articulated structure, indissoluble in the horizontal direction.

If it is desired to have these single-layered structures locked in the vertical direction as well, the modular units are manufactured with complementary notches and lowered surfaces in the lobes and lobe receiving parts. In those notches and recessed surfaces, it is applied, before interlocking the units, an adequate separator, that will function between the latch pin and the units it joins.

Once the structure is assembled, the notches and recessed surfaces form respectively, filling holes and cavities shared with adjacent units, into which fluid cement is injected which, when it hardens, creates a latch pin that acts in the vertical direction. Due to the different setting time of this latch pin with respect to the units it unites, and due to the aforementioned separator, it is not subject to them, but is independent, and therefore the flexibility of the structure is preserved. Furthermore, there is also naturally free space in the articulated joints. Because they are thin, the orifices allow the cement injected into them, once it has hardened, to break easily. On the other hand, the shared cavities where the latch pin is formed are sufficiently large for the formed piece not to break with the loads anticipated for a given structure. Thus described is the assembly of simple structures of one layer. The first structure is locked in the horizontal direction and the second is locked in the vertical direction due to its latch pins for one layer.

If it is desired to build structures of two layers, the modular units differ from those used in the formation of simple structures, since said units are provided with recessed surfaces on one of their horizontal faces, while the other is flat. The notches in these units for structures of two layers remain on the perimetral sides. Since each unit of the first layer is articulated with the adjacent units in the layer, and below a similar unit of the second layer, but which has recessed surfaces and notches facing those of the unit of the first layer, and the unit of the second layer is also articulated with units adjacent to it in the second layer (each one of which also has its cavities facing the cavities of the unit of the first layer over which it is placed) a single shared cavity is formed between the adjacent pieces in said first and second layers, a cavity where the latch pin will be formed between two layers, previous application of a separator to the notches and recessed surfaces.

Once the first layer is assembled, a concrete separator is put in place before assembling and placing the second layer. A free space naturally continues to exist in articulated joints of adjacent pieces in the same layer, exactly as in single-layer structures. Once the two layers are assembled, fluid cement is injected into the cavities through the holes or orifices formed by the meeting of the notches of the upper layer, until all of the spaces thereby created are completely filled.

When the cavities are filled and once the cement has set, it becomes a latch pin that secures each of the units to adjacent units, both in the first and in the second layer, each one of the units being joined to adjacent units, with flexibility and articulation in both the horizontal and the vertical direction, because of the separator and the later setting time of the pins with respect to the units in whose cavities they are formed, prevents them being adhered to the units. Also in this case, in a similar manner as in one layer, the bolts are easily broken while the latch pins remain unbreakable, depending on the desired use.

If it is desired to build multiple structures composed by the union of three or more simple structures of the present invention, a modular unit is used with recessed surfaces on both horizontal faces instead of on a single face, as is the case for structures of two layers. The end layers of the multiple structure are formed with units of those employed for two layers, and the intermediate layers are formed with units that have recessed surfaces on both horizontal faces.

Between each layer, prior to placement, a concrete separator is applied, which makes it possible to keep the functional characteristics of this constructive system once the latch pins are formed through the injecting and later hardening of the fluid cement in the filling hole and cavities designed for such purpose, both on which also a separator is applied before injecting the fluid cement. Also, for three or more layers, the filling holes are sufficiently thin as to permit the bolts—later formed—to break easily, and the cavities on which the latch pin is formed are sufficiently big in order to avoid the latch pin breaking, depending on the planned use of the structure.

The articulated unions between adjacent units in the same layer also have free space in the case of structures of three or more layers, as in the one layer structure.

DETAILED DESCRIPTION OF THE INVENTION

Figure 1:
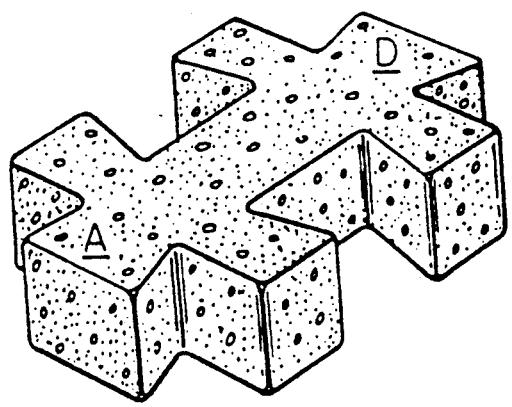
FIG. 1 is a perspective view of a typical modular unit of the present invention.
Figure 2:
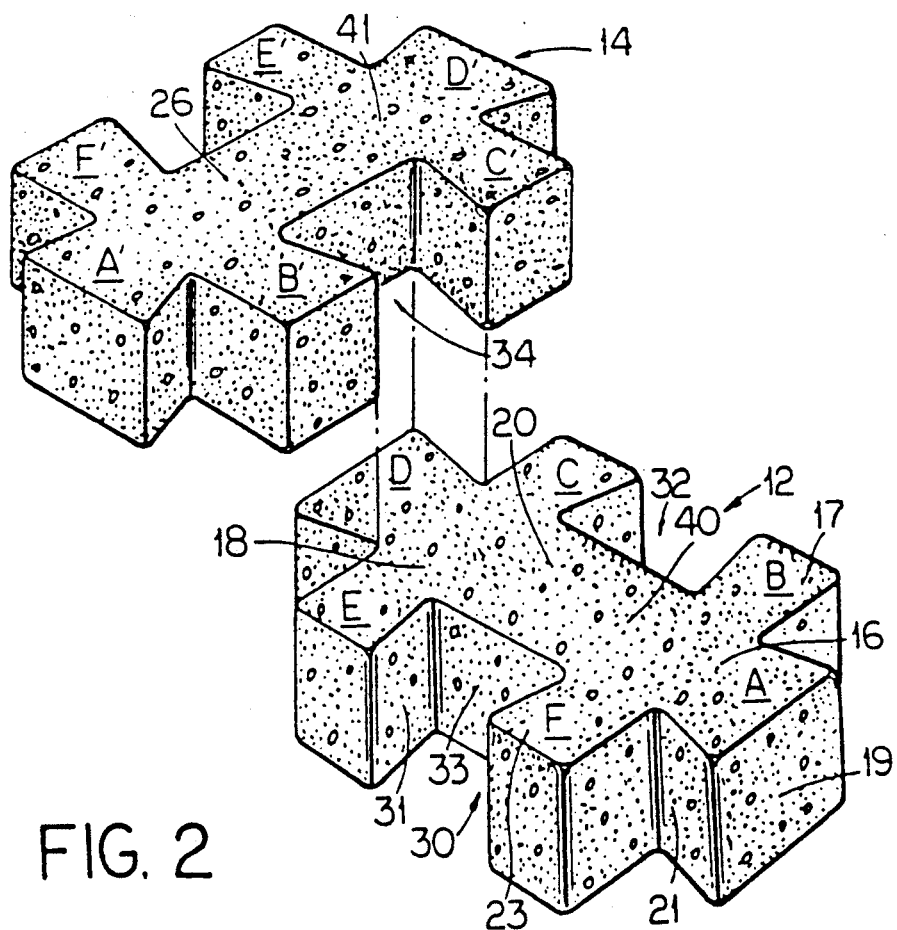
FIG. 2 is a perspective view of two interlocking modular units, corresponding to a first embodiment thereof, for structures of a single layer and without a latch pin.

FIG. 2 illustrates the manner of interlocking two identical units 12 and 14 of a first embodiment of this invention, which is used to form structures of one layer locked horizontally by means of articulated joints, but without vertical locking. As can be seen, units 12 and 14 each consist of a first end portion 16 in the form of a "T" and a second end portion 18, also in the form of a "T", united by a spanning portion 20. The end portion 16 in the form of a "T" consists in turn of an end lobe A and the lateral lobes B and F, while the end portion 18 consists of the end lobe D and the lateral lobes C and E.

As can be observed in unit 12, an end lobe receiving space 32 is formed between the lateral lobes B and C, as well as an end lobe receiving space 30 between the lateral lobes F and E.

The receiving space 30 has a neck receiving portion 31, narrow, which is situated on the part most distant from the spanning portion 20, and a wide head receiving portion 33, integral to the spanning portion 20. The receiving space 30 is typical of all the receiving spaces of each of the modular units of the present invention, except that in other embodiments there ar additionally notches for forming orifices, and in a given case there are also recessed surfaces.

The end lobe A shown in FIG. 2 is typical of all the end lobes of each of the modular units of this first invention, with the same exceptions just mentioned for receiving spaces. The end lobe A has a head portion 19 and a neck portion 21.

The head portion 19 becomes thinner from a wider part to a narrower part, as it joins with the neck portion 21. Extending generally perpendicularly to neck portion 21 on either side are shoulders 17 and 23. As will be described further herein, the head of each end lobe of each unit is interlocked within the lobe receiving space of an adjacent unit to form the flexible, articulating joint with free space. Since the head of the end lobe is wider than the neck, and the receiving space is narrower at its neck receiving portion than at its head receiving portion the end lobes will not pull away from an adjacent unit once they are engaged by sliding the head and neck into the receiving space from above or below. However, there is a free space between the articulated adjacent units due to the fact that the end lobes are sufficiently smaller than the receiving spaces so that the units can move slightly and transmit to adjacent units part of the forces to which they are subjected. For this, of course, it is also necessary that the modular units be each sufficiently strong, as not to break when subjecting the resulting structure to the planned use. However, such displacement is not sufficient as to affect the proper interlock of adjacent units.

In order to facilitate the discussion of the invention, each pavement unit will have identified a first flat surface and a second flat surface. The first flat surface on unit 12 is shown on the top and bears reference number 40. Unit 12 has its second flat surface on the bottom and cannot be seen in FIG. 2.

Figure 3:
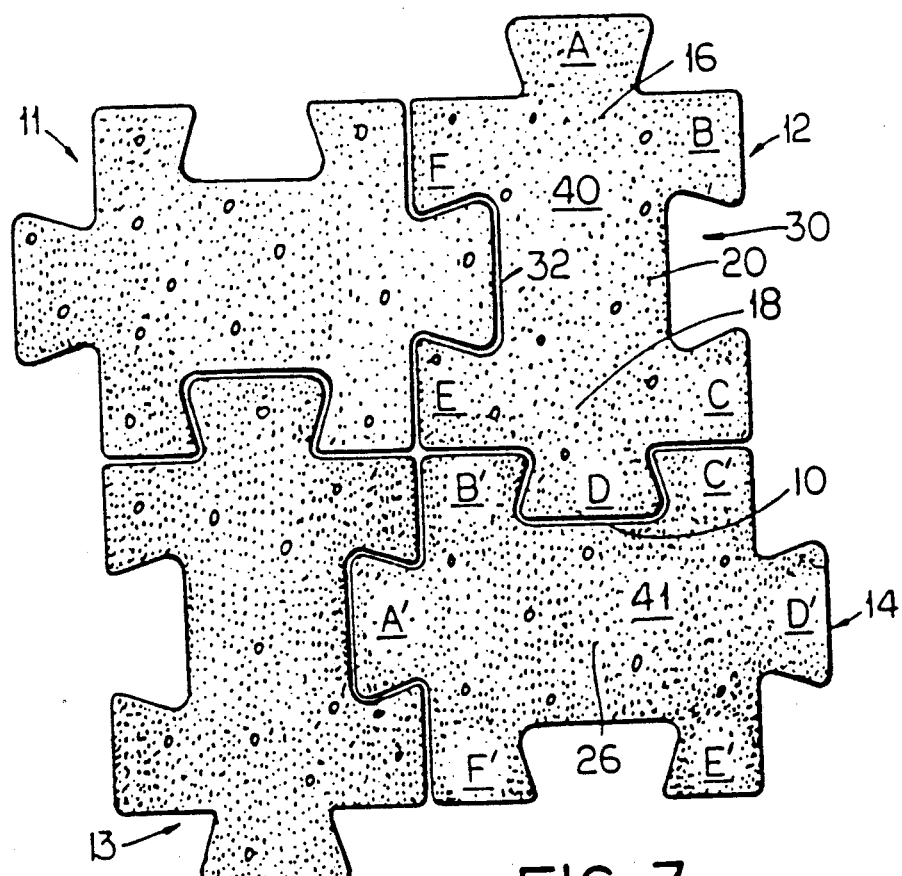
FIG. 3 is a top view of four interlocked units of a first embodiment.

Because the modular units are substantially identical, when they are interlocked as shown in FIG. 3, the separate units 11, 12, 13 and 14 are held in a generally fixed spacial relationship. In FIG. 3 the end lobe D of unit 12 has been articulated in end lobe receiving space 34, formed in unit 14 between lobes B' and C'.

Thus, when a multiplicity of units are articulated, the side walls of each unit are joined, leaving substantially a free space with the side walls of the adjacent units, forming load distribution joints.

FIG. 3 shows one of such joints along the union of the side lobe E of unit 12 with the side lobe B' of unit 14, another joint is shown along the union of the final lobe D of unit 12 with spanning portion 26 of unit 14, and another along the side lobe C of unit 12, in its union with the side lobe C' of unit 14. These load distribution joints are flexible and ca be articulated both in the horizontal and the vertical direction.

The free space between the articulated units is approximately 3 mm. In these joints a certain flexion and articulation range can compensate certain irregularities of the surface where the modular units are placed. Likewise, when weights are placed on individual units, the load forces are distributed to adjacent units through the load distribution joints.

It can also be appreciated, both in this first embodiment and in the following ones, that a great variety of forms of the modular units and of their lobes can be designed so that they articulate with the proper clearance among the units and form a given structure of one or more layers with use in pavement foundations, pavements, slopes, canals, walls, arches and bridges.

Figure 4:
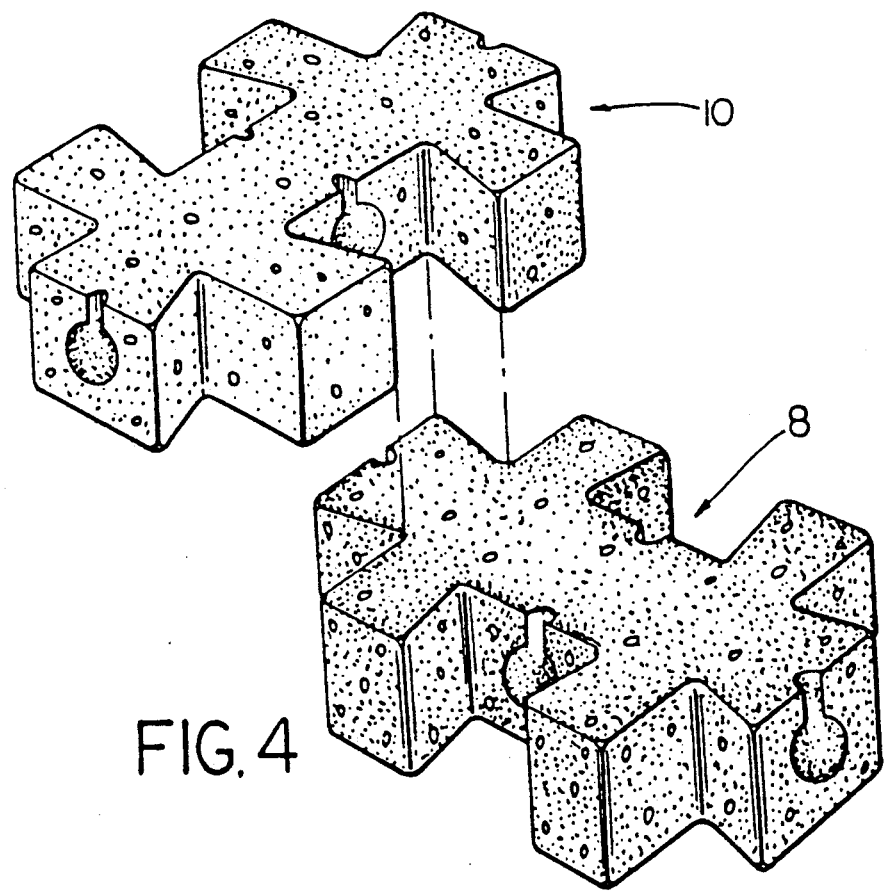
FIG. 4 is a perspective view of a second embodiment of modular unit of the present invention, interlocking with another modular unit, with latch pins which limit the vertical movement between units.
Figure 5:
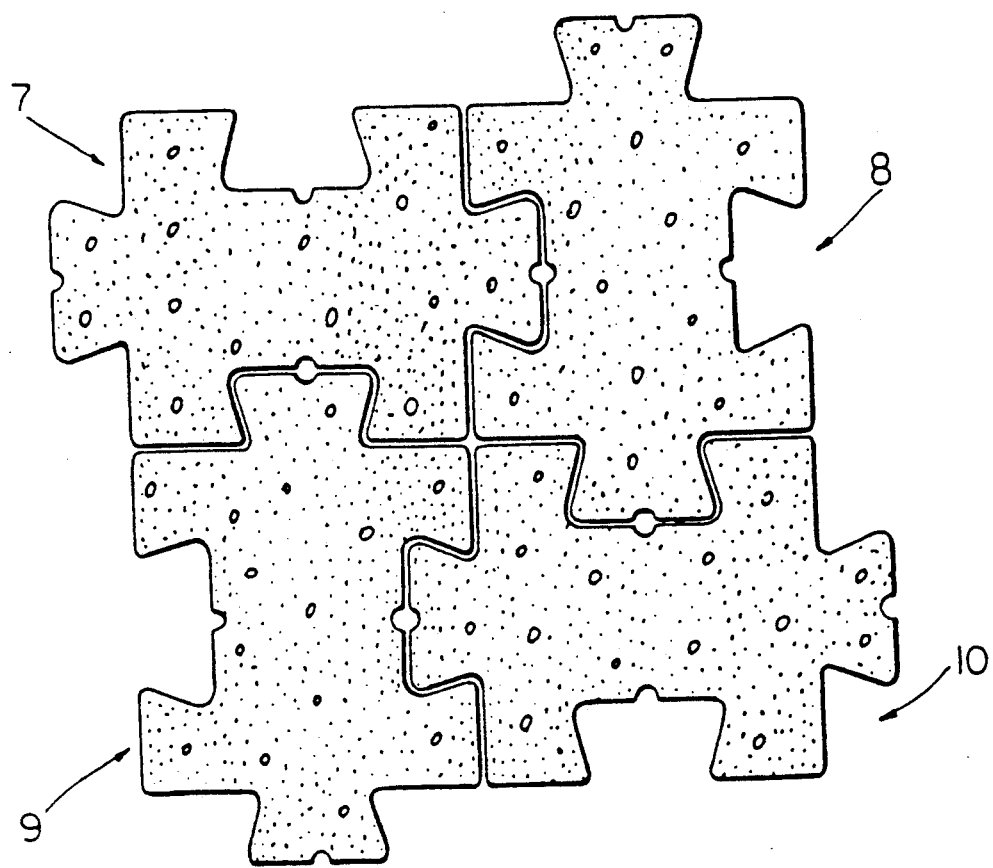
FIG. 5 is a top view of four interlocked units equivalent to the second modular unit embodiment.

For its part, FIG. 4 illustrates the interconnection of two identical units 8 and 10 characteristic of the second embodiment of this invention, used to form structures of one layer with latch pin in the vertical direction. The difference of these units from the just described units 12 and 14 consists in that units 8 and 10 have additional notches and cavities in heads and head receiving portions. In such notches and cavities, prior to assembling the units, a convenient separator is applied.

Once the structure is assembled, fluid cement is injected into said cavities through the orifices. When the cement sets, a latch pin is formed which restricts the vertical displacement between the articulated units, said pin does not affect the proper flexibility of the structure, since, besides the separator, it sets after the units it locks, and therefore is not united to them, and furthermore, the notch is made sufficiently thin for the bolt to break easily, but not so the casting of the cavity where the latch pin will be formed, since said cavity is made sufficiently large for the latch pin not to break once it is formed. An expert in the field will agree that the cavities where the latch pins are formed could be of very different forms, provided that they interlock appropriately the adjacent units. As for the rest, that described with respect to units 12 and 14 is valid also for units 8 and 10.

FIG. 4 is similar to FIG. 3, except for the cavities and notches of units 7, 8, 9 and 10.

Figure 6:
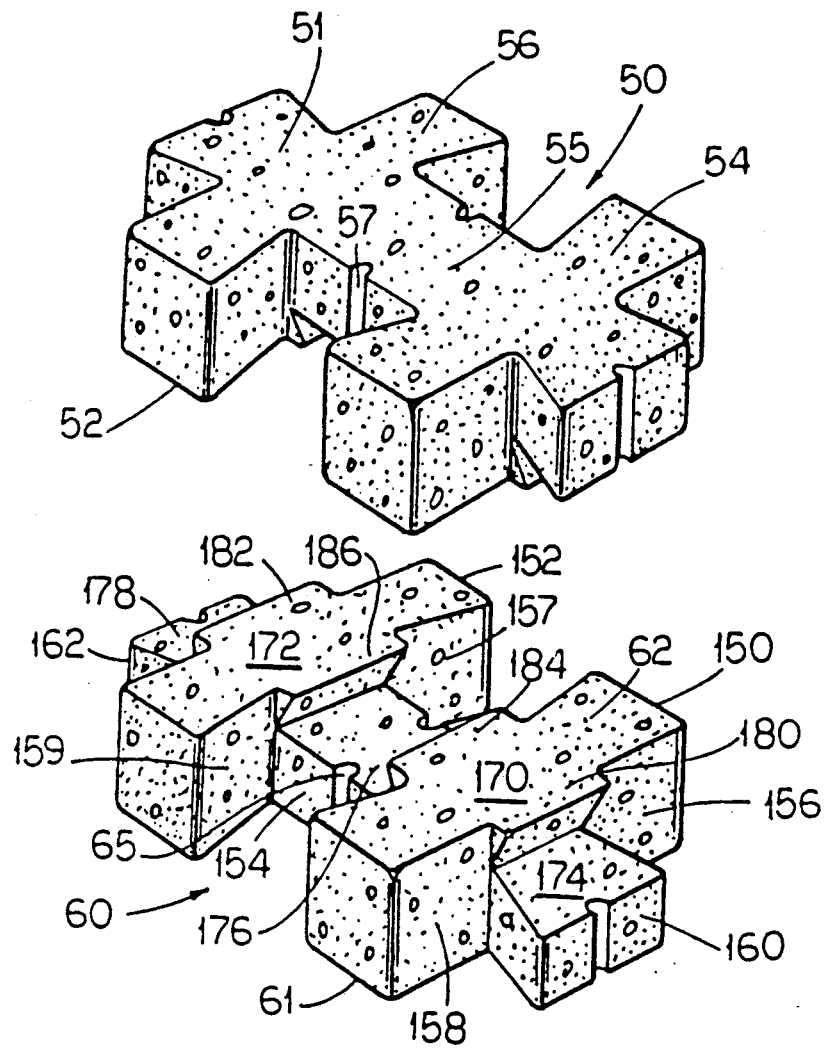
FIG. 6 is a perspective view of a third modular unit embodiment of the invention to be placed atop another similar unit, having its horizontal faces inverted with respect to the lower unit, for forming structures of two layers.

FIG. 6 shows a perspective view of a third preferred embodiment of the present invention, where unit 50 is identical to unit 60, except that unit 60 has been overturned. This embodiment is used for structures of two layers, and to shape the end layers of structures of three or more layers, as will be seen further on.

For explanation purposes, each unit can be understood to have a generally flat top side and a bottom side. In FIG. 6 unit 50 has a flat top side 51 and a bottom side 52. Unit 60 has been flipped over and its top side 61 is facing downwardly while its bottom side 62 is facing upwardly. As will be seen, the terms "top" and "bottom" are used for identification purposes and do not necessarily mean that on any given unit the "top" side will be facing upwardly and the "bottom" side will be facing downwardly.

As can be further noted in FIG. 6, unit 60 has an end T-shaped portion 150 and a spanning portion 154. While the top side 61 of unit 60 is generally flat and smooth, bottom side 62 has an uneven contour. The uneven contour is the result of raised and lowered sections designed to create cavities when the units are placed upon one another. On unit 60, the surfaces 170 and 172 of shoulder sections 156 and 158 and shoulder sections 157 and 159 are raised above the bottom side surfaces 174 and 178 of end lobes 160 and 162 and the bottom side surface 176 of spanning portion 154. Further, FIG. 6 illustrates that steps 180 and 182 slant inwardly from surface 170 to surface 174, and from surface 172 to surface 178. In the same way, steps 184 and 186 slant inwardly from surface 170 to surface 176 and from surface 172 to surface 176. Inwardly slanting steps 180, 182, 184, and 186 result in the formation of shared cavities between the modular units when the units are articulated in a single layer and when they are later placed one over the other in the union of two layers When the bottom side 52 of unit 50 is placed upon bottom side 62 of unit 60, layer cavity 73 is formed (FIG. 9) as will hereinafter be described further. As can be seen in FIG. 6, unit 50 has a notch 57 in spanning member 55 connecting side lobes 54 and 56. When unit 50 is placed on top of unit 60 with surfaces 52 and 62 contacting each other, fluid cement can be injected through notch 57 to substantially fill the cavities formed between units 50, 60 and the units adjacent to them, which enter in their respective lobe receiving spaces, which are two additional units in each layer. Naturally, between each layer a concrete separator goes first.

Once the cement hardens, a latch pin is formed. This allows securing the adjacent units, allowing them to be interlocked at the same time, although their union is flexible and articulatable both in the vertical and in the horizontal direction, since the latch pins are not joined to the units, due to that mentioned regarding the latch pins on a single layer, and also because of the separation between layers. The sizes of orifices and cavities for forming latch pins, as in the case of single-layer structures, are such that they allow the latch pin not to break, and the bolt formed in the injection orifice to do so. Also, in the case of two-layer structures, as in three or more layers, which will be later described an expert in the field will deduce that the cavities for obtaining latch pins can be of many different forms, provided that they lock conveniently the modular units.

With regard to the other forms and dimensions, the units for two layers shown in FIG. 6 are similar to those used for a layer shown in FIG. 2, although they may be thicker if so desired.

Figure 7:
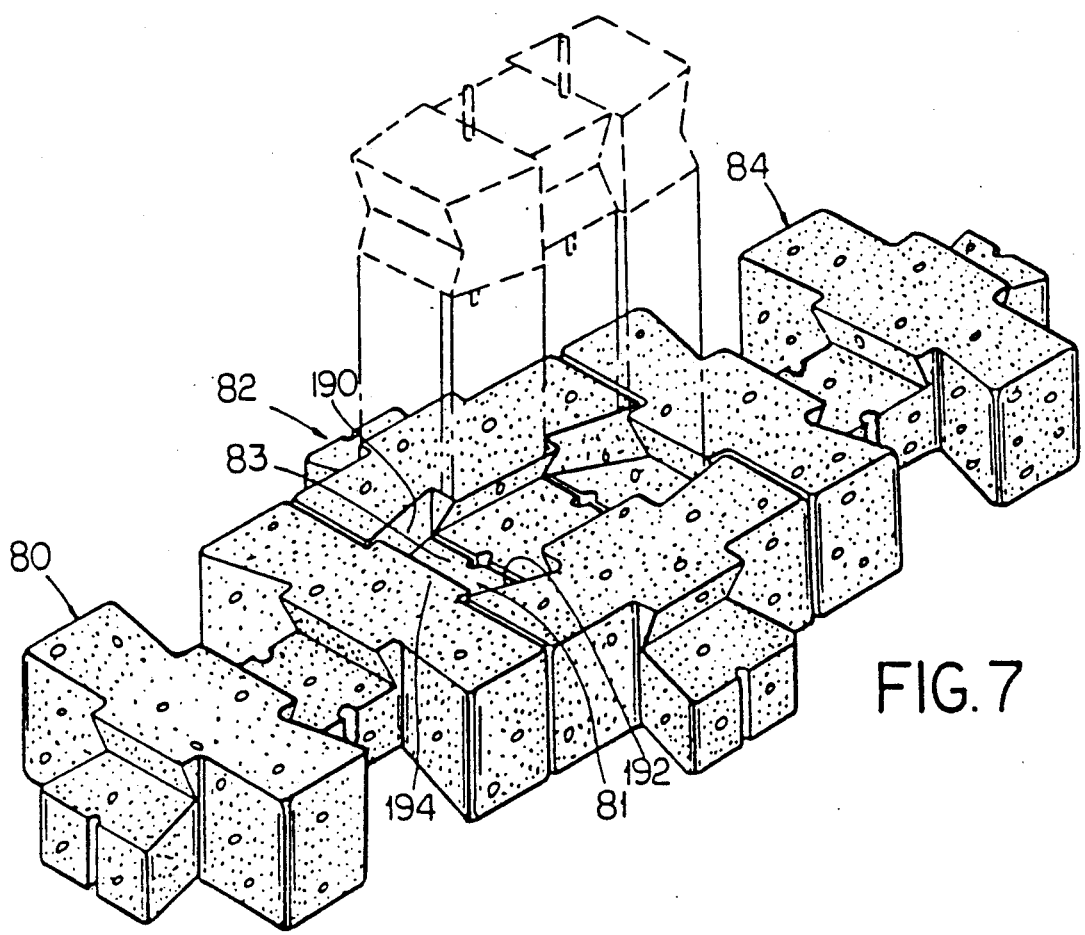
FIG. 7 is a perspective view of three of the interlocked units of said third embodiment of this invention, showing in dotted lines and in explotation, the bolts and latch pin that formed when another three similar ones are placed atop the three units, with their cavities downwards.

In the construction of a flexible articulated structure of this additional embodiment of this invention, a first layer of units identical to unit 60 of FIG. 6 is put in place. These units are placed individually and articulated. In FIG. 7, unit 80 is placed and then articulated with unit 82, which is brought downward. Then, unit 84 is articulated with unit 82 and also put downward. Thus, each of the units in this first layer is articulated with adjacent units of said layer, as shown in FIG. 7, with each of the lobes being received in a corresponding lobe receiving space.

Final lobe 83 of unit 80 is shown in FIG. 7, interlocked in lobe receiving space 81 of unit 82. This is accomplished by bringing the head and neck of lobe 83 down from above and into lobe receiving space 81. It is clear that end lobe 83 cannot be otherwise interlocked in space 81 once unit 80 has been placed in the indicated position.

Figure 8:
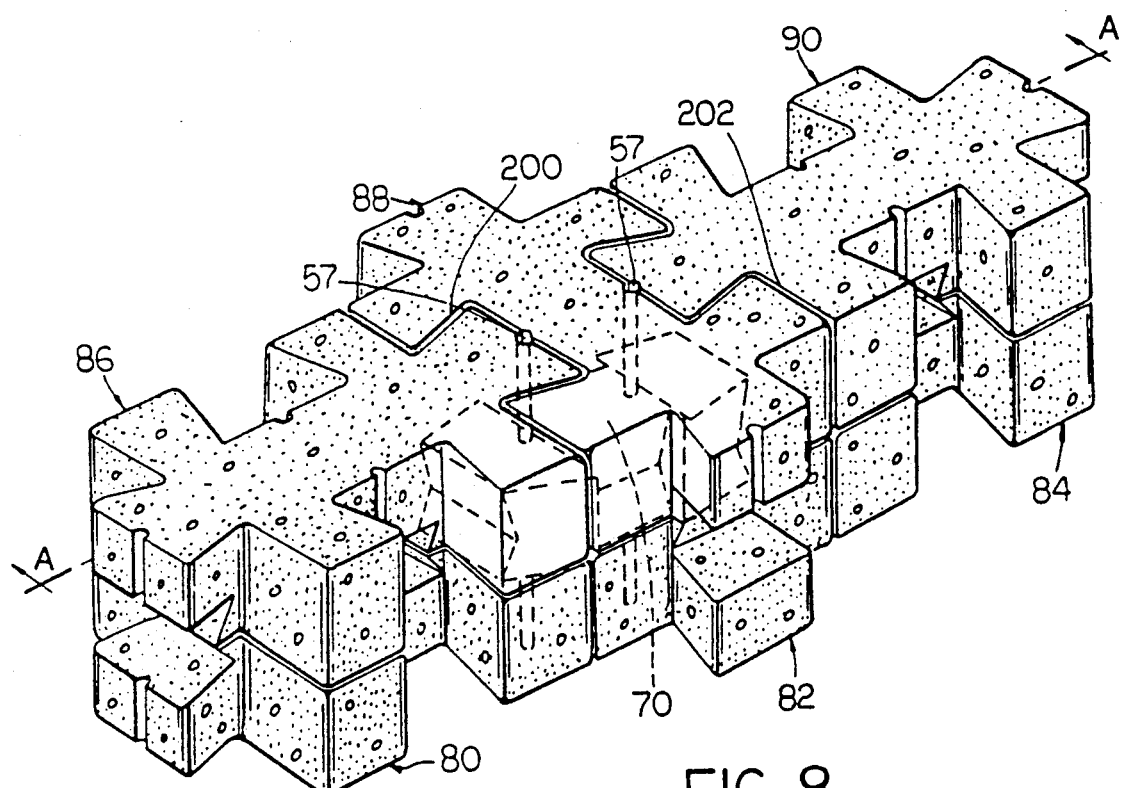
FIG. 8 is a perspective view of six of the units of said third embodiment of the present invention, interlocked in two layers, with the bolts and latch pin formed between adjacent units shown in dotted lines.
Figure 9:
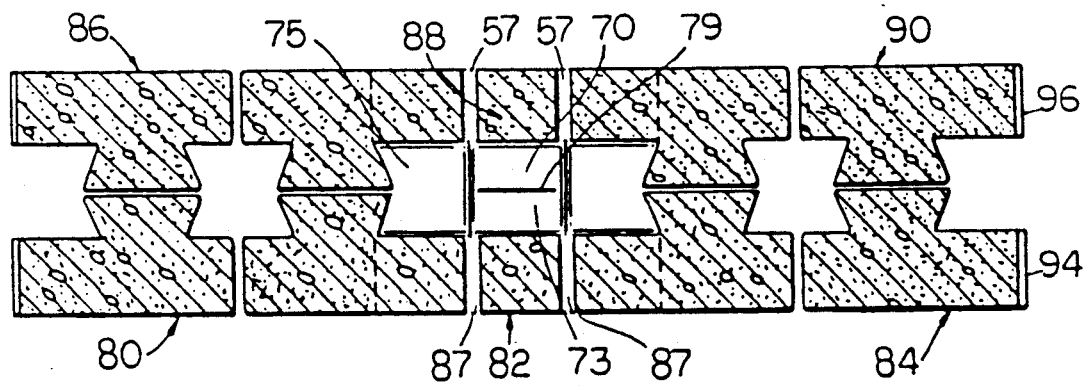
FIG. 9 is a cross-sectional view taken along the line A—A' of FIG. 8.
Figure 10:
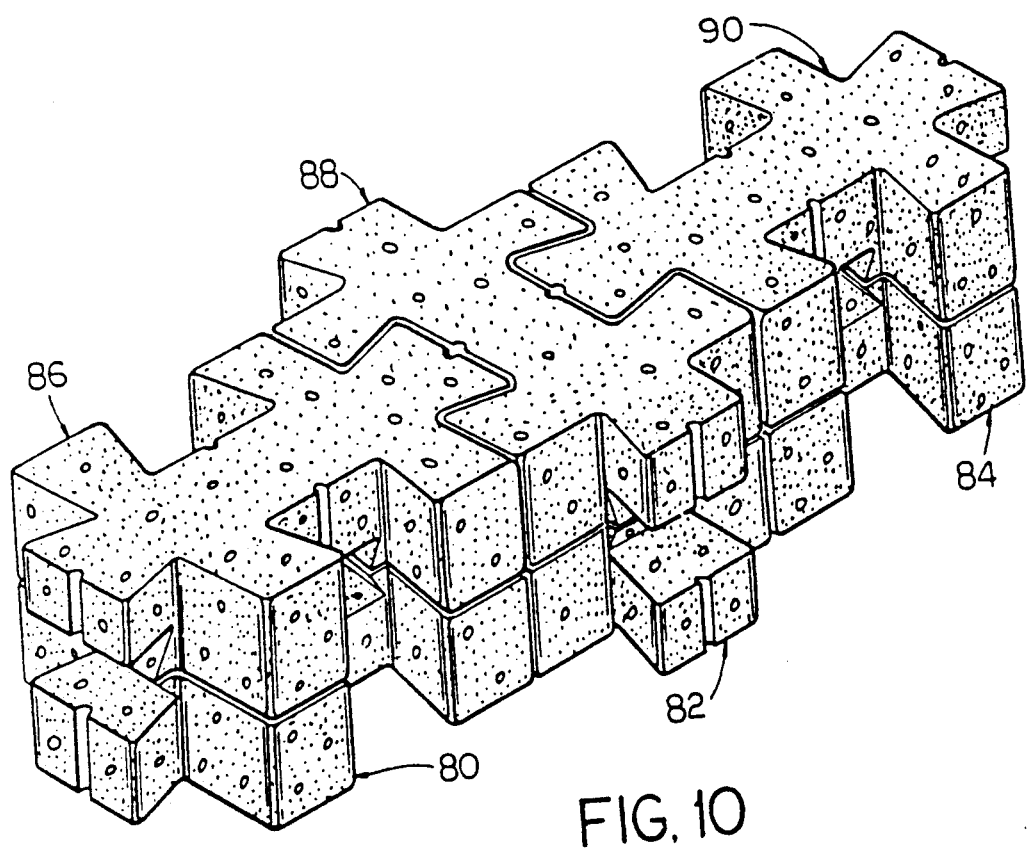
FIG. 10 is a perspective view of six of the units of the third embodiment of the present invention, interlocked in two layers.

Also, it will be noted in FIG. 7 that the interlocking of lobe 83 in lobe receiving space 81 results in the formation of adjacent cavity 75 between units 80 and 82 (see FIG. 9). Said cavity 75 is formed between shoulder sections 190 and 192 of unit 82, and step 194 sloped inward of unit 80. If necessary for a particular us of the present invention, over the first layer of units and once a concrete separator is placed, a second identical layer of units is placed. Each of the units in this second layer is interlocked with adjacent units of the second layer, as can be observed in FIG. 8. In it, units 86, 88 and 90 have been interlocked and have been placed atop units 80, 82, and 84.

As a result of the positioning of the second layer over the first, and because of the configuration and form of the modular units, shared cavities are created between the first and second layers.

Once the two interlocked layers are placed one on top of the other, prior placement between them of a concrete separator, sufficient fluid cement is injected through the notches specifically created in the units, so that the cavities existing between the units are substantially filled. After the cement has hardened sufficiently to form the latch pin 70, the adjacent units both inside the layers and between them are secured together, remaining locked although their union is flexible and articulatable both in the horizontal and the vertical direction. This articulation is possible since there is sufficient free space between adjacent units in the same layer in articulated joints 200 and 202, shown in FIG. 8, and also because the concrete separator is between the layers. Unit 88 is laid over unit 82 and they are secured together by means of latch pin 70 although, because of the separator, and since the latch pin sets after the units it secures, it is not united to them, resulting in articulation and flexion in this multilayered unit (88, 82, and 70). Thus, there is also certain compensation of the irregularities of the surface where the multilayered structure is placed.

FIG. 9 represents units 80, 82 and 84, articulated to form a first layer 94, and units 86, 88 and 90, articulated to form a second layer 96. Whole cavity 79 between layers is shown formed between the first layer 94 and the second layer 96.

FIG. 9 also shows latch pin 70 which results from the setting of the cement injected through notches 57 in unit 88 in order to enter cavity 79 between layers 94 and 96, and in notches 87 in unit 82 after the formation of the two layers 94 and 96.

Figure 11:
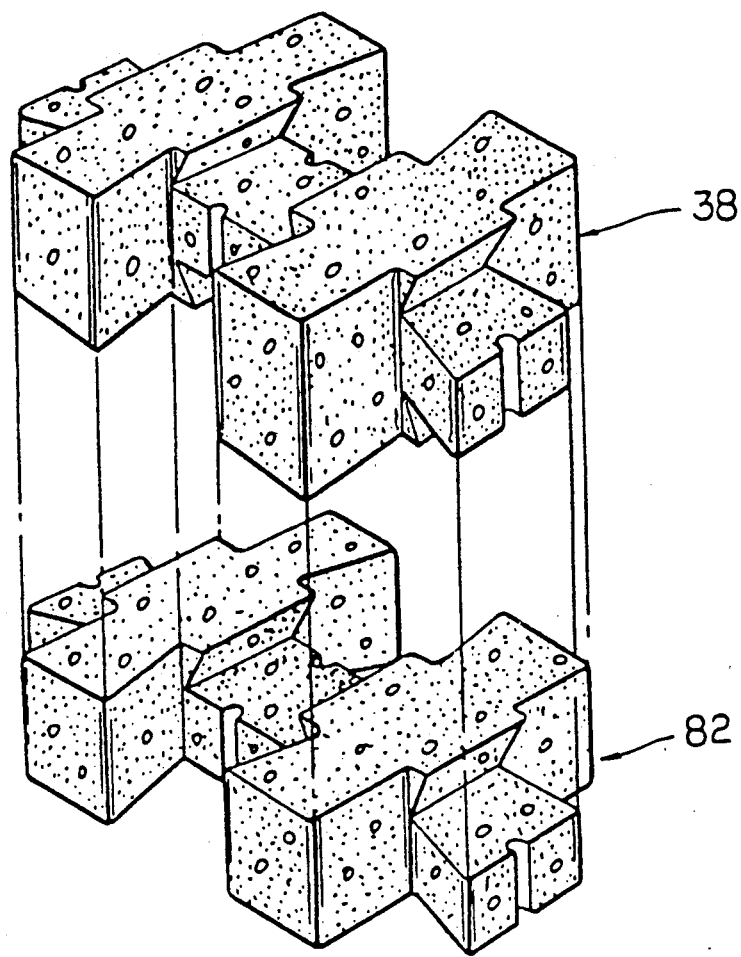
FIG. 11 is an exploded perspective view of a fourth modular unit embodiment of the present invention placed atop a typical unit of the third embodiment. This fourth modular unit embodiment is for intermediate layers of structures of three or more layers.
Figure 12:
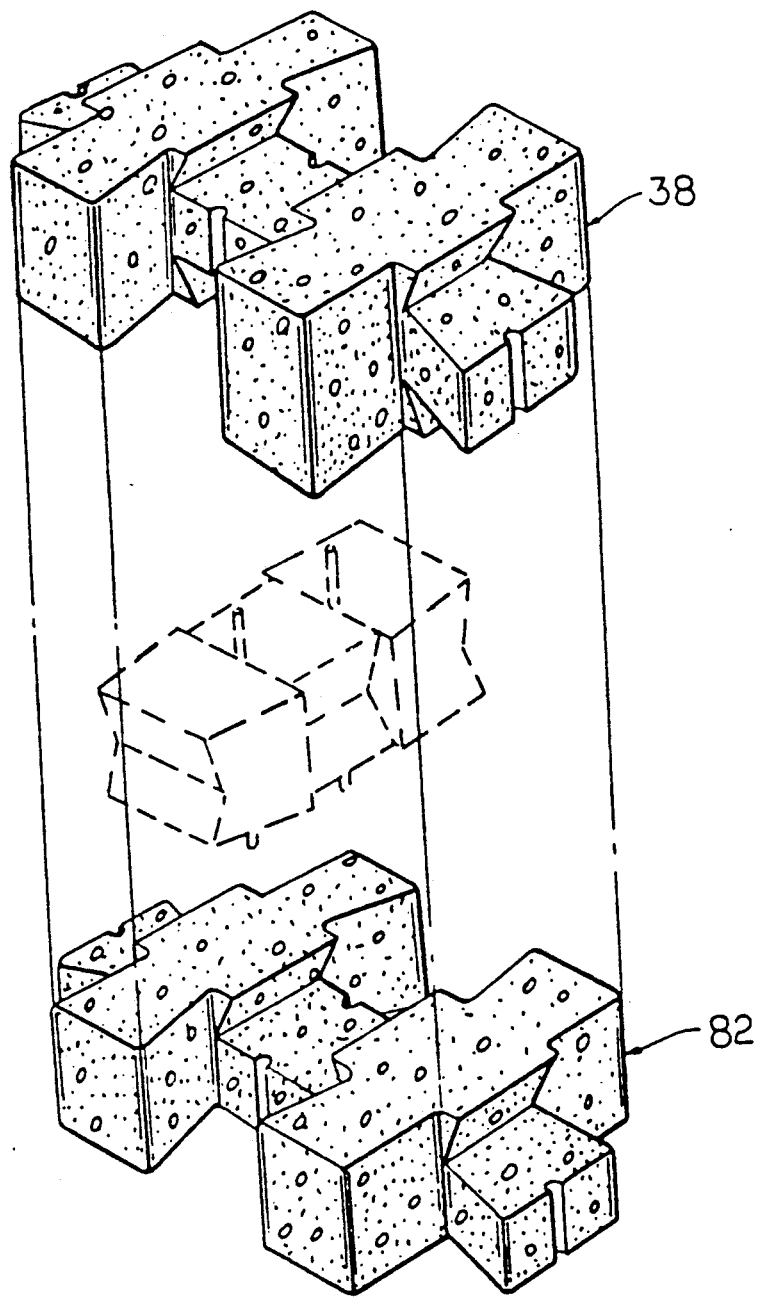
FIG. 12 is an exploded perspective view showing the bolts and latch pins, in dotted lines, formed between the units shown when the other four adjacent units are put in place.
Figure 13:
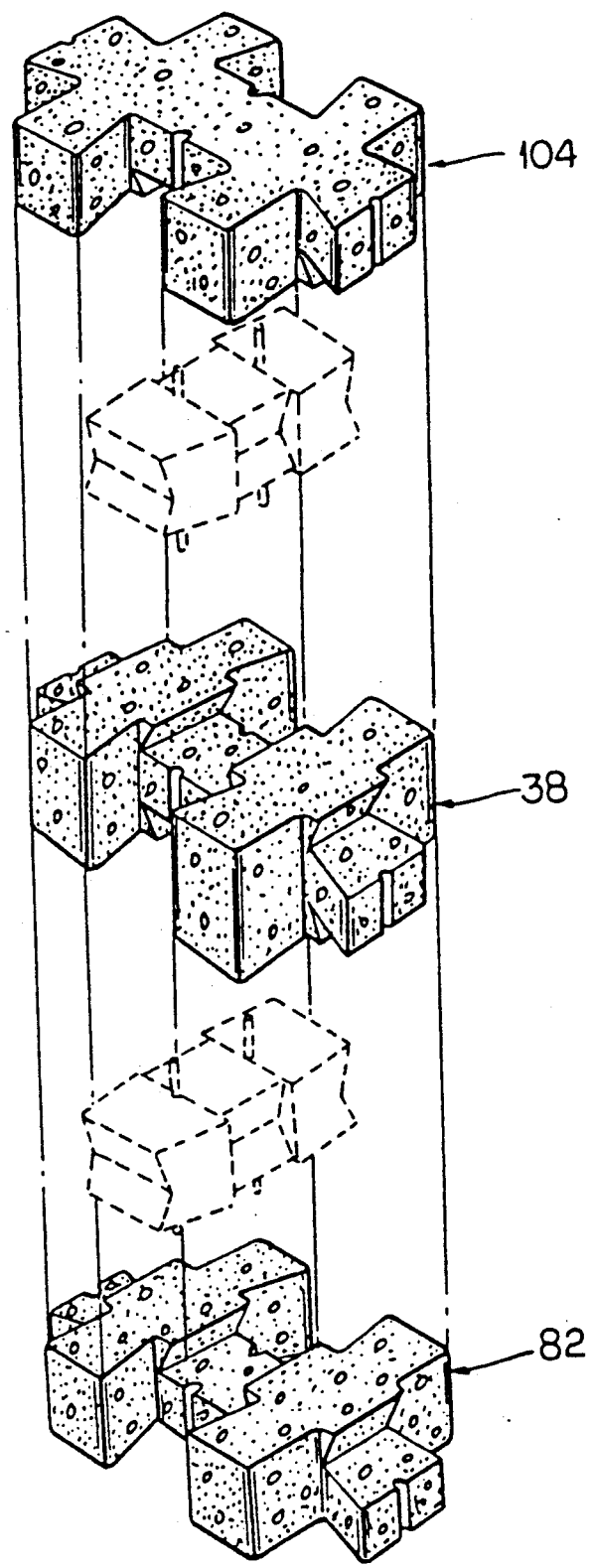
FIG. 13 is an exploded perspective view showing the bolts and the double latch pin, in dotted lines, formed between three units when the other six adjacent units are in place.
Figure 14:
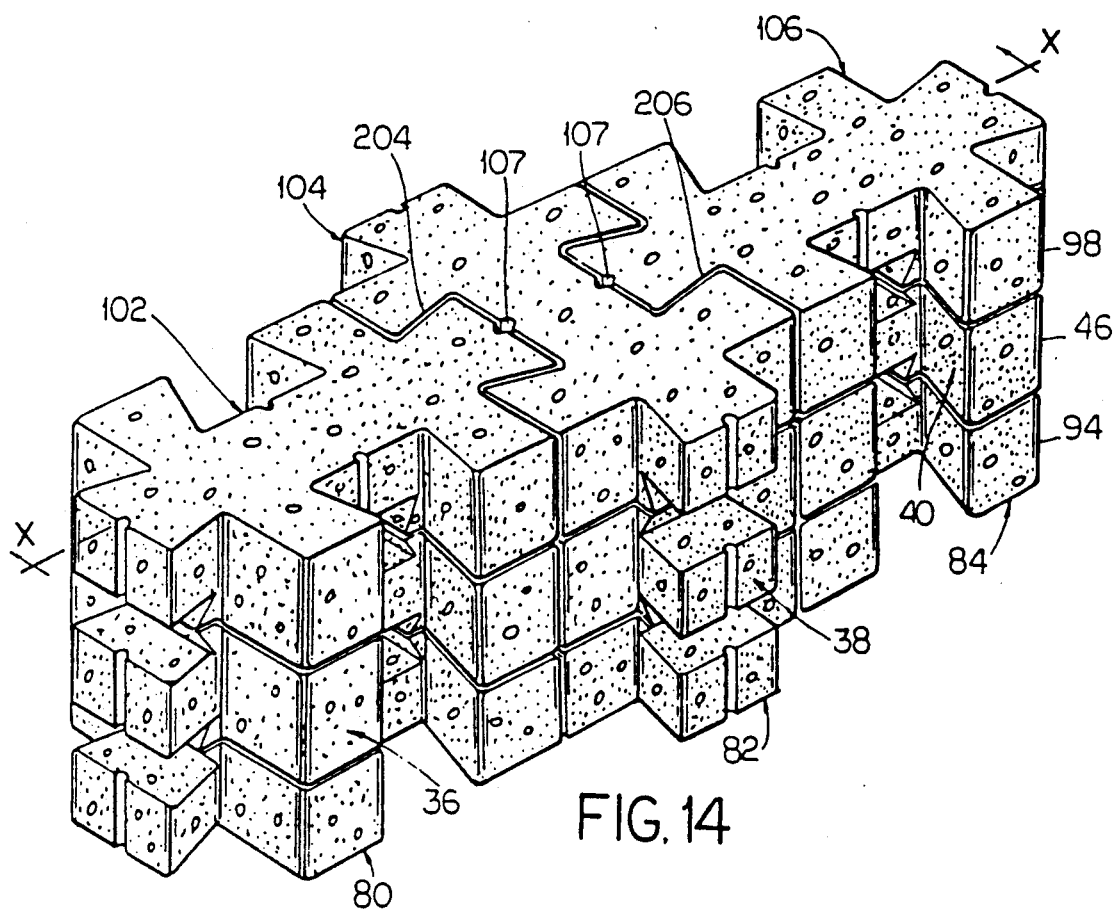
FIG. 14 is a perspective view of nine of the units of this invention, interlocked in three layers with the end layers of typical units of the third embodiment and the inbetween layer of units of the fourth embodiment.

If we want a structure of three or more layers, for the end layers, units are used similar to those shown in FIG. 6, and for the intermediate layers, units like that shown in the upper part of FIG. 11, which is exactly the same as the units of FIG. 6 except that it does not have a single face with an uneven contour, but rather both faces, so that it can form cavities simultaneously with units immediately above and below it. FIG. 14 illustrates a structure that includes a third layer 98 formed by the interlocking of units 102, 104, 106, and their placement above layer 46. The double latch pin 105 (FIG. 15) is shown as a result of the setting of the fluid cement injected through notch 107 of unit 104, and which is allowed to flow between the articulated units, prior placement of the concrete separator between each layer, and between filling holes and recessed surfaces, with respect to the units they lock.

Figure 15:
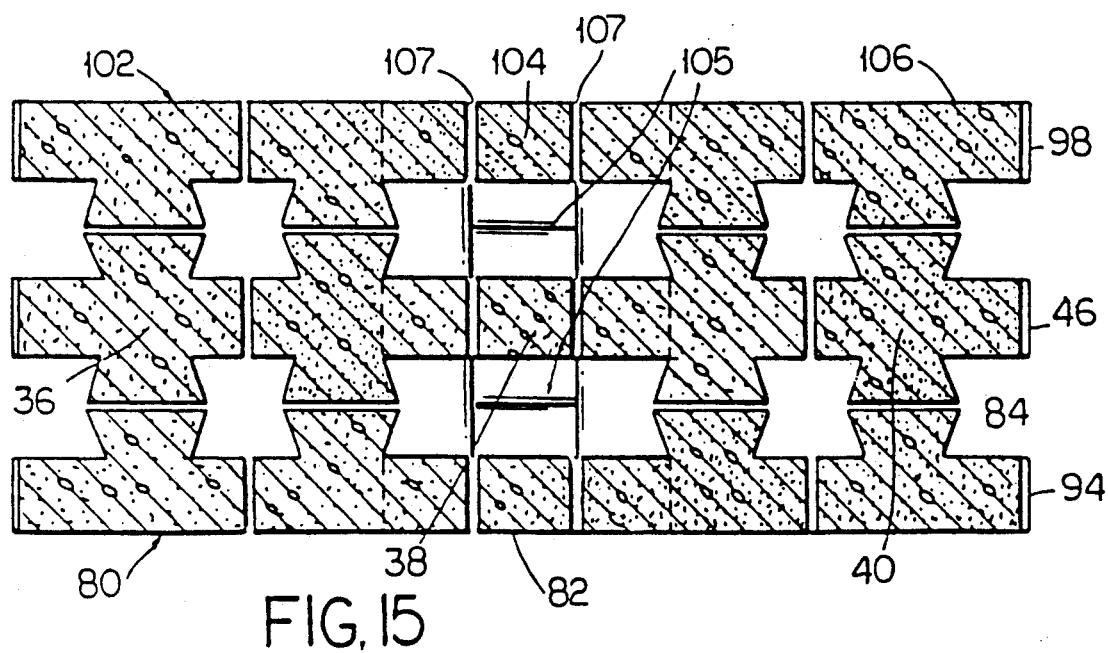
FIG. 15 is a cross-sectional view, taken along line X—X' of FIG. 14, showing a double latch pin.

Due to the fact that there is also in this embodiment a free space between adjacent units in the same layer, in the articulated joints 204 and 206 of FIG. 14, and also due to the concrete separator between layers, and to the later setting of double latch pin 105, and due to its own separator, the articulation and flexibility of the multilayered unit formed by units 82, 38, 104, and the double latch pin 105, is possible. The units of the fourth embodiment can be thicker if necessary. Also in this case, of course, the orifices where the bolts will be formed are sufficiently thin so that they break easily, once the cement forming them is hardened; likewise, the cavities are sufficiently large for the latch pin that is formed with the cement not to break when the resulting structure is submitted to the anticipated loads Thus, three separate layers of articulated units are formed, layers that can be flexed and are articulated both horizontally and vertically. FIG. 15 illustrates a transverse sectional view that shows nine units, which are 80, 82, 84, 36, 38, 40, 102, 104 and 106, and that form three layers which are 94, 46, and 98, joined with the double latch pin 105.

Figure 16:
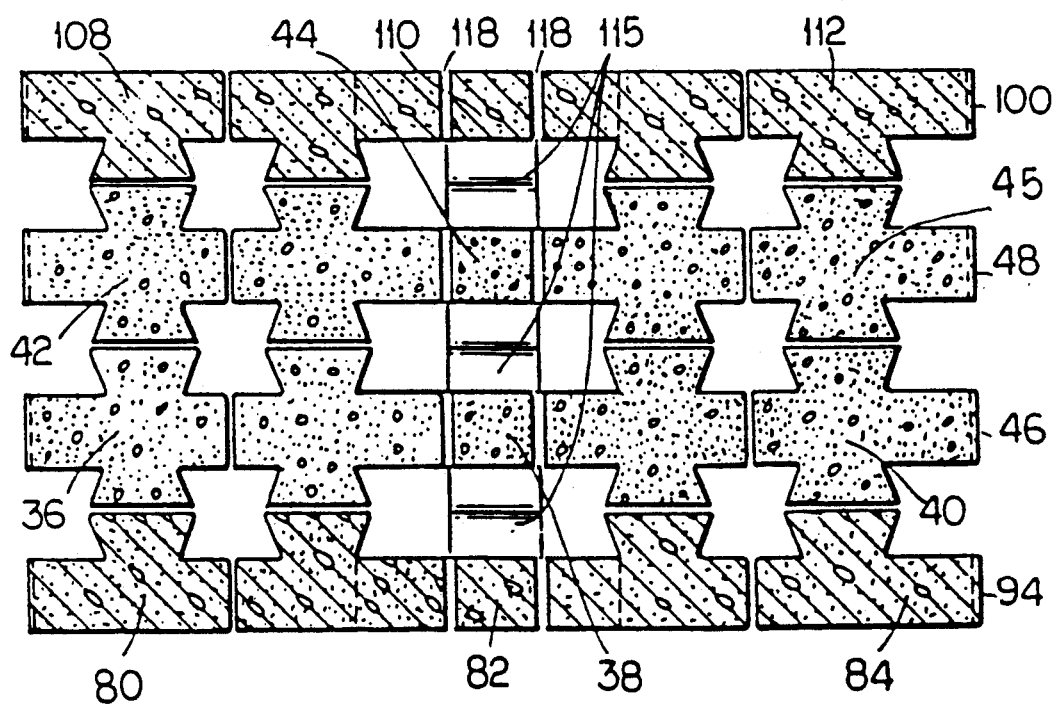
FIG. 16 is a cross-sectional view of twelve of the units of this invention, interlocked in four layers, with the bolts and the triple latch pin formed between the adjacent units; the lower (base) and upper end layers formed by units of the third embodiment, and the two intermediate layers formed by units of the fourth embodiment.

If necessary, this invention can result in the construction of a four layer arrangement, like that shown in FIG. 16. Three additional modular units, 108, 110 and 112 are shown interlocked forming layer 100, and the triple latch pin 115 results from the injection of cement through orifices 118 formed by the union of the modular units of layer 100, cement which fills the filling holes and cavities formed between layers 100, 48, 46 and 94 of this structure, securing said layers to each other.

Also in the case of three or more layers, a free space is obtained in the articulated joints of the adjacent units in the same layer, which together with the concrete separators between layers and the later setting of the latch pins, and the separator applied to filling holes and cavities, previous to cement injection, provide a flexible articulated union of the components of said multilayer structure.

Also in this embodiment, the orifices and cavities for the formation of the latch pins have the same characteristics described for the previous structures, that is, the orifices are sufficiently thin for the cement bolts obtained to break easily, while the cavities produce sufficiently strong latch pins to prevent the breakage thereof.

The system of this invention offers a wide rang for the realization of structures, such as pavement foundations, pavements, slopes, canals, walls, arches, and bridges, and the formation of simple and multiple structures, that is, of a single layer and of two, three or more layers, using the different embodiments of modular units described above for this purpose. As emphasized earlier, the structures obtained, in each of their executions, allow the distribution of the vertical and horizontal forces along the modular units adjacent to those over which the pressure is exercised by, for example, a vehicle.

For better and complete understanding of the advantages of the constructive system claimed in this application, described below are the ways of performing the simple and multiple structures, using the appropriate modular units in each case:

I. Simple structure without latch pin

For the formation of this type of structure, modular units are used like those presented in FIG. 2, and the procedure followed has the following characteristics:

(a) placement of a multiplicity of equal modular units which each include interlockable lobes and spaces to receive those lobes, in such a way that these units interlock through the reception of the lobes of each unit in the lobe receiving spaces of the adjacent modular units until the simple structure desired is obtained; and (b) with the interlocking of the units, obtaining a free space or clearance between each one of the adjacent units as a result of the specific dimensional relationship between the lobes and the lobe receiving spaces, said clearance allows the interlocked units a certain margin of displacement, without affecting their interlocking, and provides the structure with a flexible, articulatable load distribution joint in both the horizontal and the vertical direction.

II. Simple structure with latch pin

The formation of this class of structure is similar to that of the structure of subsection I, except that in this case a modular unit is used that has notches and recessed surfaces like those illustrated in FIG. 4, but with a perimeter similar to that of the units used in the structure of the above subsection. On interlocking of these units, the providing of these notches and recessed surfaces on the perimetral sides of each modular unit provides a hollow space or cavity between adjacent units in order to inject fluid cement into it and to create latch pins once the cement injected into the hollow spaces has set. Before injecting the cement, an adequate separator is applied to notches and recessed surfaces. The set cement produces in the notches a concrete bolt with a sufficiently thin diameter to allow its easy breakage. For its part, the latch pin is sufficiently resistant that it does not break and acts as an element that insures indissolubility of these simple structures in the vertical direction.

Due to the separator utilized, and also to later setting of the latch pin and of the bolt and the ease with which the latter breaks, as well as due to the free spaces or play obtained between the interlocked units, a flexible structure that distributes loads and is indissoluble vertically and horizontally is obtained.

III. Multiple structures

This classification includes those structures composed by two or more layers of interlocked modular units. To facilitate the description of each of the alternatives possible with this system, it is advisable to subdivide the multiple structures in the following way:

(a) structures of two layers; and (b) structures of three or more layers.

For the formation of structures of two layers, like that represented in FIG. 8, modular units are used whose perimetral sides are essentially the same as those of the modular units used for the formation of the structures described in subsections I and II. Nevertheless, the units for structuring this embodiment of two layers present a characteristic difference from those units used in the simple structures, which consists in providing some recessed surfaces on one of their horizontal sides. As the units of the first layer are arranged upwards and the surfaces of the second layer of modular units are directed downwards opposite those of the first layer, these surfaces result in a cavity with a sufficient volume to serve as a mold for a latch pin that is formed, previous separator, when fluid cement is injected through the notches of the interlocked modular units.

As can be observed in FIG. 8, the final structure of the two layers presents an upper flat surface with play or free spaces between the unions of the units, resulting in a structure with a flexible, articulated joint.

As in the case of simple structures that include a latch pin, the latch pin of these two-layered structures is independent from the surrounding units as a result of the separator and of the later setting of this latch pin. Likewise, the bolt that is formed with the injection of said material is provided in order to have dimensions such as permit its easy breakage and avoid the structure obtained becoming rigid.

For the formation of three-layered structures, modular units of the type used in the formation of two-layered structures are used for the upper and lower end layers, that is, units with one of their horizontal faces provided with recessed surfaces (see FIG. 7), while the intermediate layer consists of modular units provided with recessed surfaces on their two horizontal faces, recessed surfaces similar to those of the modular unit used for the two-layered structures.

The special design of the horizontal faces of the intermediate units make it possible to obtain hollow spaces or cavities between the first layer and the intermediate layer for the formation of the latch pins adjacent to these first two layers of the structure. In the same way, between the upper end layer and the intermediate layer, their contact surface provide corresponding cavities for the formation of latch pins, also to prevent the excessive vertical displacement between these layers of the structure.

We point out that for the formation of multiple structures, whether of two, three or more layers, it is anticipated arranging a separator between the layers, and also apply it to all notches and recessed surfaces, in such a way that this and the free spaces or play obtained in each of the layers composing the multiple structure, provide a structure with a flexible articulated joint capable of distributing a part of the loads, both horizontally and vertically.

While this invention has bee described in connection with certain preferred embodiments of the modular units, it is not intended to limit this invention to the particular forms described, but, on the contrary, it is intended to cover alternatives, modifications and equivalents, as may be included within the spirit and scope of the invention as defined by the appended claims.

I claim:

1. A constructive system comprising a multiplicity of rigid identical modular units to form a one layer simple structure having clearance joints, allowing the partial transmission, in both horizontal and vertical directions, of loads applied on one or more said units to adjacent units, said system further comprising said identical modular units each having flat, continuous, horizontal upper and lower faces and smooth outer sides, said sides further provided with interlocking lobes and lob e receiving spaces, said modular units interlockable by placing a lobe of one of said units in one lobe receiving space of another adjacent unit, said interlocked structure providing said clearance joints among each of said interlocked units and said adjacent ones whereby a movement of said units is obtained when loads are applied to them, said movement allowing only said partial transmission of the stress among said units without affecting said interlocking of said units of said structure.

2. The invention of claim 1, wherein said clearance joints formed among said interlocked units result from the different size of said lobes which are sufficiently smaller than the area formed by said lobe receiving spaces, such that said units move properly upon applying said loads thereon and to transmit part of said loads to said adjacent units without said movement affecting said interlocking of said units.

3. A constructive system comprising: a multiplicity of rigid identical modular units to form a one-layer interlocked structure having latch pins and clearance joints, said joints being provided to allow the partial transmission of the loads applied on one unit to the adjacent units, said identical modular units having interlocking lobes and lobe receiving spaces along the outer edges of said units, said units interlockable by placing a first lobe of one unit in a first lobe receiving space of an adjacent unit; said interlocked structure providing said clearance joints among each of said interlocked units and said adjacent ones whereby a movement of said units is obtained when said loads are applied to them, said movement allowing only said partial transmission of the stress among said units without affecting said interlocking of said units of said interlocked structure, each said modular unit having continuous flat horizontal upper and lower faces and notches and recesses in some of said sides of said modular units to form, respectively, shared filling holes and cavities among said adjacent units in which said latch pins are respectively formed by injecting fluid cement in said shared spaces to achieve vertical interlocking of said units in said structure.

4. The invention of claim 3, wherein said clearance joints formed among said interlocked units result from the different size of said lobes which ar sufficiently smaller than the area formed by said lobe receiving spaces, such that said units may move properly upon receiving said loads thereon and to transmit part of said loads to adjacent units without said movement affecting said interlocking of said units.

5. The invention of claim 3, wherein a proper separator is applied in said notches and said recessed surfaces prior to injection of said fluid cement.

6. The invention of claim 3, wherein each said latch pin of said structure further comprises an unbreakable, sufficiently strong, body adopting any proper shape and actuating as an element limiting excessive vertical movement of said modular units.

7. The invention of claim 3, wherein each said bolt is sufficiently thin so that it may be broken easily, allowing thus the flexibility of said interlocked units for the appropriate partial transmission of loads to be exerted on each said unit of said structure.

8. The invention of claim 3, wherein said bolts and said latch pins are independent elements from said modular units as a result of a separator applied to said notches and said recessed surfaces, the easy breakage of said bolts and said bolts and latch pins setting subsequent to the setting of said modular units.

* * * * *

UNITED STATES PATENT AND TRADEMARK OFFICE
CERTIFICATE OF CORRECTION

PATENT NO. : 5,035,532
DATED : July 30, 1991
INVENTOR(S) : Roberto Lascurain

It is certified that error appears in the above—identified patent and that said Letters Patent is hereby corrected as shown below:

On the title page:

Item [19] reads "Gargollo" should read --Lascurain--.

Item [76] reads "Roberto L. Gargollo, Alpes 650, Lomas de Chapultepec 11000, Mexico"

should read

--Roberto Lascurain, Alpes 650, Lomas de Chapultepec 11000, Mexico--.

Signed and Sealed this

Third Day of November, 1992

Attest:

DOUGLAS B. COMER

*Attesting Officer*     *Acting Commissioner of Patents and Trademarks*